United States Patent
Deschenes

(10) Patent No.: US 10,102,464 B2
(45) Date of Patent: Oct. 16, 2018

(54) PRE-PRINTED SURFACE FOR HANDWRITING, COMPRISING A PRE-PRINTED GRAPHICAL REPRESENTATION OF THE PASSING OF A PERIOD OF TIME, AND ASSOCIATED COMPUTER PROGRAM

(71) Applicant: HOLDHAM, Herouville-Saint-Clair (FR)

(72) Inventor: Laurent Andre Pierre Deschenes, Cairon (FR)

(73) Assignee: HOLDHAM, Herouville-Saint-Clair (FR)

( * ) Notice: Subject to any disclaimer, the term of this patent is extended or adjusted under 35 U.S.C. 154(b) by 0 days.

(21) Appl. No.: 15/327,398

(22) PCT Filed: Jul. 13, 2015

(86) PCT No.: PCT/FR2015/051930
§ 371 (c)(1),
(2) Date: Jan. 19, 2017

(87) PCT Pub. No.: WO2016/012694
PCT Pub. Date: Jan. 28, 2016

(65) Prior Publication Data
US 2017/0169321 A1 Jun. 15, 2017

(30) Foreign Application Priority Data
Jul. 22, 2014 (FR) ..................................... 14 57073

(51) Int. Cl.
G06K 19/06 (2006.01)
B42D 5/04 (2006.01)
(Continued)

(52) U.S. Cl.
CPC ....... G06K 19/06046 (2013.01); B42D 5/042 (2013.01); B42D 15/0006 (2013.01);
(Continued)

(58) Field of Classification Search
CPC ................ B42D 15/0006; B42D 5/042; G06K 19/06028; G06K 19/06037; G06K 19/06046; G09D 3/00
(Continued)

(56) References Cited

U.S. PATENT DOCUMENTS 6,666,376 B1* 12/2003 Ericson ............... G06F 3/03545
235/375
8,690,062 B1* 4/2014 Qureshi ............. G06Q 10/1093
235/375
(Continued)

FOREIGN PATENT DOCUMENTS

EP 2 682 902 A1 1/2014

OTHER PUBLICATIONS

"Review: Leuchtturm 1917 'Whitelines Link' notebook—Scrively—note taking and writing", published Apr. 20, 2016 and retrieved from http://scrively.org/review-leuchtturm-1917-whitelines-link-notebook/ Jun. 6, 2018.*
(Continued)

Primary Examiner — Claude J Brown
(74) Attorney, Agent, or Firm — Leydig Voit and Mayer

(57) ABSTRACT

A pre-printed surface for handwriting includes a pre-printed graphical representation of the passing of a period of time and at least one entry creation zone so that a user can identify part of the period of time and create an entry in the period of time. The pre-printed surface also includes a pre-printed mark for local identification of at least the entry creation zone. The pre-printed surface also includes a pre-printed mark for global identification on the pre-printed surface.

17 Claims, 7 Drawing Sheets

(51) Int. Cl.
    *B42D 15/00*    (2006.01)
    *G09D 3/00*    (2006.01)
(52) U.S. Cl.
    CPC . *G06K 19/06018* (2013.01); *G06K 19/06028*
    (2013.01); *G06K 19/06037* (2013.01); *G09D*
    *3/00* (2013.01)
(58) Field of Classification Search
    USPC ........................................................ 235/494
    See application file for complete search history.

(56)            References Cited

U.S. PATENT DOCUMENTS

2005/0013104 A1*  1/2005  Feague ................. G06F 1/1626
                                                          361/679.3
2007/0247665 A1* 10/2007  Rosenfeld ............ G06Q 10/109
                                                           358/1.18
2007/0273917 A1* 11/2007  Encrenaz ............... G06K 15/02
                                                           358/1.15
2009/0034845 A1*  2/2009  Saund ................ G06Q 30/0225
                                                            382/188
2011/0205370 A1*  8/2011  Griffin ............... G06K 9/00449
                                                           348/207.1
2012/0020562 A1*  1/2012  Vojak ................... G06K 9/2063
                                                            382/182
2013/0073329 A1*  3/2013  Shoham ................. G06Q 10/10
                                                           705/7.18
2016/0026892 A1   1/2016  Hansson

OTHER PUBLICATIONS

Renesse, R.; "Optical Document Security", (3$^{rd}$ Edition), *Artech House*, Boston/London, pp. 142-146, (2005).
European Patent Office; International Search Report in International Patent Application No. PCT/FR2015/051930 (dated Dec. 8, 2015).

* cited by examiner

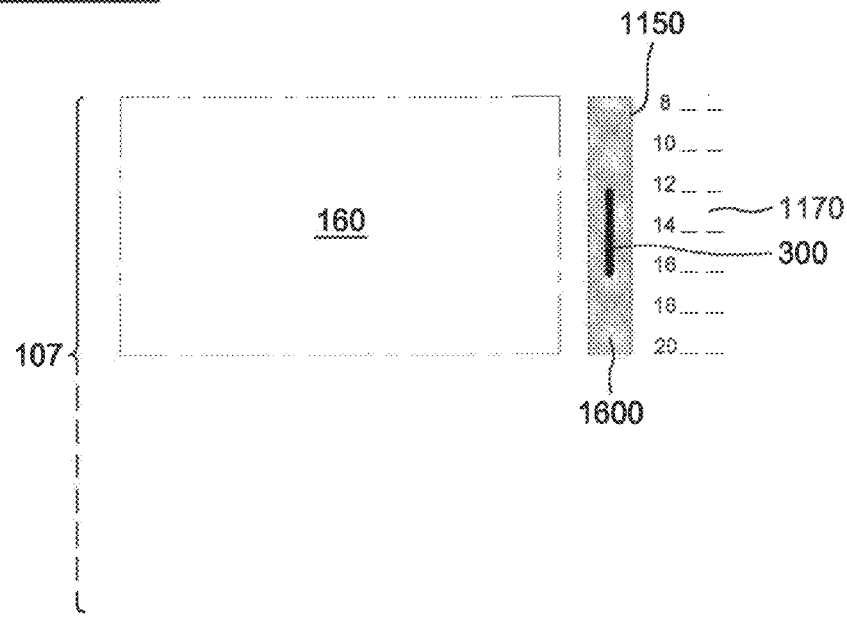
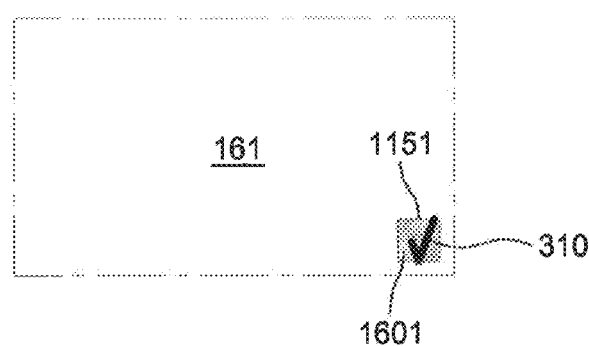

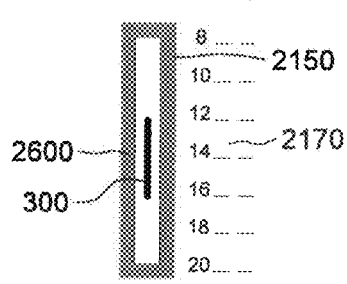
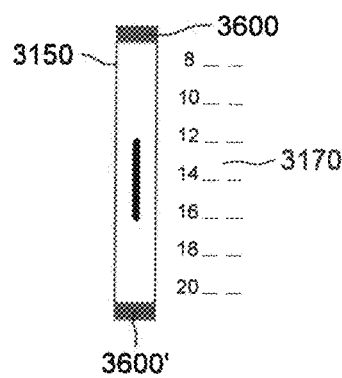
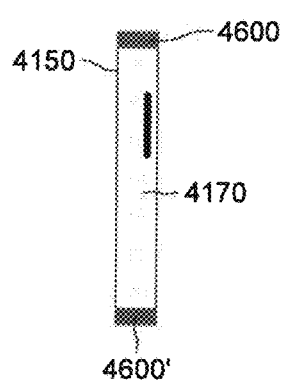
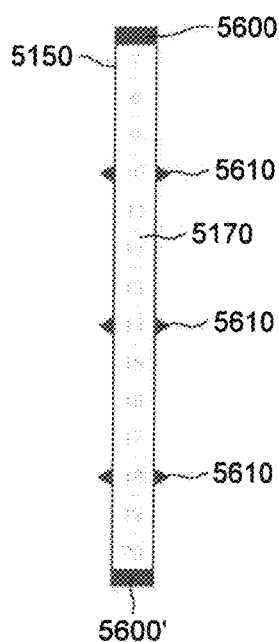
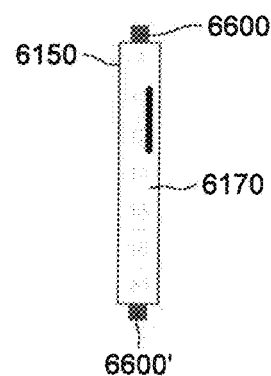

Fig. 12

PRE-PRINTED SURFACE FOR HANDWRITING, COMPRISING A PRE-PRINTED GRAPHICAL REPRESENTATION OF THE PASSING OF A PERIOD OF TIME, AND ASSOCIATED COMPUTER PROGRAM

TECHNICAL BACKGROUND

The invention falls in the field of stationery items making it possible to keep a schedule or log—or more generally allowing time tracking—such as day planners, calendars or time books.

The invention also falls in the field of computer programs making it possible to keep a schedule (electronic planner) or digital log on electronic devices such as smartphones, digital tablets, or desktop computers.

These two time tracking tools are well known, but they are problematic to synchronize for users who wish to use both tools at the same time. Typically, a person may wish, either in a professional context or in his personal life, to use his paper day planner at the office or at home, and an electronic day planner when he is on the go. The person is then required to copy entries made with the first of these two tools to the second one regularly, which is tedious and a source of errors.

Document EP 2,682,902 teaches a printed surface having marks identifying a zone dedicated to handwriting, as well as a graphic code on which information characterizing the surface is present. Once the zone is used to take handwritten notes, an image of the surface is obtained using a picture-taking device that is not necessarily planar. The image is processed based on information extracted from the graphic code to correct the perspective, then the dedicated writing zone is extracted from the image.

Document WO 2013/187832 also teaches a page including marks making it possible, when analyzing a video stream from the camera, to identify the marks and extract an image to be processed therefrom. The marks are lighter than the background of the page.

These disclosures pertain to printed surfaces that do not make it possible to track time.

Definition of the Invention and Related Advantages

To resolve the problems of the prior art, proposed is a pre-printed surface for handwriting, comprising a pre-printed graphical representation of the passing of a period of time and at least one entry creation zone so that the user identifies part of the time period in order to create an entry in the time period, the pre-printed surface also comprising a pre-printed mark to facilitate the local identification of at least one entry creation zone, characterized in that the surface also comprises a pre-printed mark for global identification on said pre-printed surface.

Owing to the global identification and local identification, the reading of the pre-printed surface can be automated, which next makes it possible to synchronize an electronic planner with a paper planner, for example.

The mark for the global identification may comprise references having a complex and distinctive graphic design to be easily identifiable in the image, even if this image has been taken under relatively unfavorable conditions (angle, brightness). Owing to this mark making up global positioning references, the pre-printed surface can be correctly globally identified in the image. Next, the image is corrected for the perspective resulting from the angle at which the image is taken. This correction is described here as a projection in a 2D plane.

The mark for global identification can also comprise a graphic code associated with information relative to the structure of the pre-printed surface, i.e., the list of components and their relative arrangements. Owing to this information, comprising a piece of information describing the global composition of the pre-printed surface, the components of the pre-printed surface can be globally identified in the image.

The local identification is used for local recalibration around a component of the pre-printed surface, in the case at hand the entry creation zones. The local identification near a zone is also described as specific identification for the zone.

For example, the pre-printed mark for local or global identification can comprise a local increase in the average intensity or the average contrast of the printing on the surface. Alternatives are possible.

In one embodiment, the pre-printed mark for local identification may comprise several pre-printed marks each to facilitate the identification of a different subdivision of said entry creation zone corresponding to a subdivision of said time period.

The pre-printed mark for local identification may in particular comprise a mark facilitating the identification of a subdivision of the entry creation zone situated near the center of the pre-printed surface. This is particularly advantageous, since although the outer corners of the pre-printed surface can be identified by their specific characteristics or using references, once these corners are identified, the elements at the center of the sheet are the most difficult to identify, since they are far from the corners.

Thus, the local mark can be used to more precisely determine certain zones once a primary zone of the pre-printed surface is defined by the global references, extracted and projected in the 2D plane.

The pre-printed mark for local identification can help with identification in the 2D plane of border of said entry creation zone. Alternatively or additionally, in certain embodiments, the pre-printed mark helps to identify a surface of said entry creation zone.

According to alternatives,
  the pre-printed mark for local identification comprises at least one mark at the head and at least one mark at the foot of an entry creation zone elongated parallel to the pre-printed graphical representation of the passing of a period of time,
  the pre-printed mark for local identification comprises at least three marks along an entry creation zone elongated parallel to the pre-printed graphical representation of the passing of a period of time, the at least three marks being separated from one another along the direction of said elongated entry creation zone,
  the entry creation zone is elongated parallel to the pre-printed graphical representation of the passage of a period of time and the pre-printed mark for local identification also identifies the entry creation zone in the direction perpendicular to the direction of elongation of the elongated entry creation zone,
  the pre-printed graphical representation of the passing of time comprises a printed scale included in said entry creation zone and printed with a lighter color or lower intensity relative to said pre-printed mark for local identification, the pre-printed graphical representation of the passing of time comprises a printed scale outside said entry creation zone, at a distance from said pre-printed mark for local identification.

The pre-printed surface may also comprise a zone for the user to take handwritten notes, said zone being associated in the pre-printing with parts of the period of time, or said zone being associated in the pre-printing with the entire period of time.

The invention may assume the form of a day planner comprising a pre-printed surface for handwriting on which the time period is equal to three or four days to represent one week over two opposite pages, or the time period is equal to one week shown on a single page or two weeks shown on a single page.

The invention may also assume the form of a notebook for taking notes on datable sheets, comprising a pre-printed surface, on which the time period is equal to one month.

The invention may also assume the form of a calendar comprising a pre-printed surface, on which the time period is equal to a number of months comprised between 3 and 24, or is equal to 7.

According to another aspect, the invention consists of a computer program characterized in that it comprises a sequence of instructions which, when executed by a computer processor, lead to carrying out a step for identifying an entry creation zone in a pre-printed surface image for handwriting, the identification being done based on a pre-printed mark for the global identification of at least the entry creation zone on the pre-printed surface and based on a pre-printed mark to facilitate the local identification of at least the entry creation zone, and said entry creation zone being associated with part of the time period, the program also comprising instructions for looking for any handwritten entry in said entry creation zone, then, if such a handwritten entry is identified, creating an electronic entry in a previously stored electronic representation of the time period and associating said electronic entry with said part of the time period.

For example, the identification is done by looking for local increase in the average intensity or average contrast of the printing on the surface.

The program may also comprise instructions for extracting a time rage by analyzing the identified handwritten entry in the entry creation zone using a timescale pre-printed on the pre-printed surface.

The program may also comprise instructions for handling any conflicts between a handwritten entry identified on the pre-printed surface and an electronic entry present in the electronic representation previously stored.

The program may also comprise instructions for extracting information from a zone of the pre-printed surface associated with said part of the passing of time, and store this information related to the created entry in the electronic representation of the passing of the period of time.

The program may also comprise instructions for creating an alarm to alert a user of the program before the beginning of the part of the time period associated with the entry creation zone in which a handwritten entry is present.

LIST OF FIGURES

The invention will be better understood, and other aims, features, details and advantages thereof will appear more clearly, in the following explanatory description in reference to the appended drawings provided solely as an example illustrating one embodiment of the invention and in which:

FIG. 3 is an aspect of the implementation of the invention by a user of the embodiment of FIG. 2.

FIG. 4 is another aspect of the implementation of the invention by the same user.

FIG. 6 is an alternative of one aspect of the invention.

FIGS. 7 and 8 are other alternatives of the same aspect of the invention.

FIGS. 9 and 10 are also alternatives of the same aspect of the invention.

FIG. 12 shows another embodiment of a printed surface according to the invention.

DETAILED DESCRIPTION OF THE INVENTION

Figure 1:
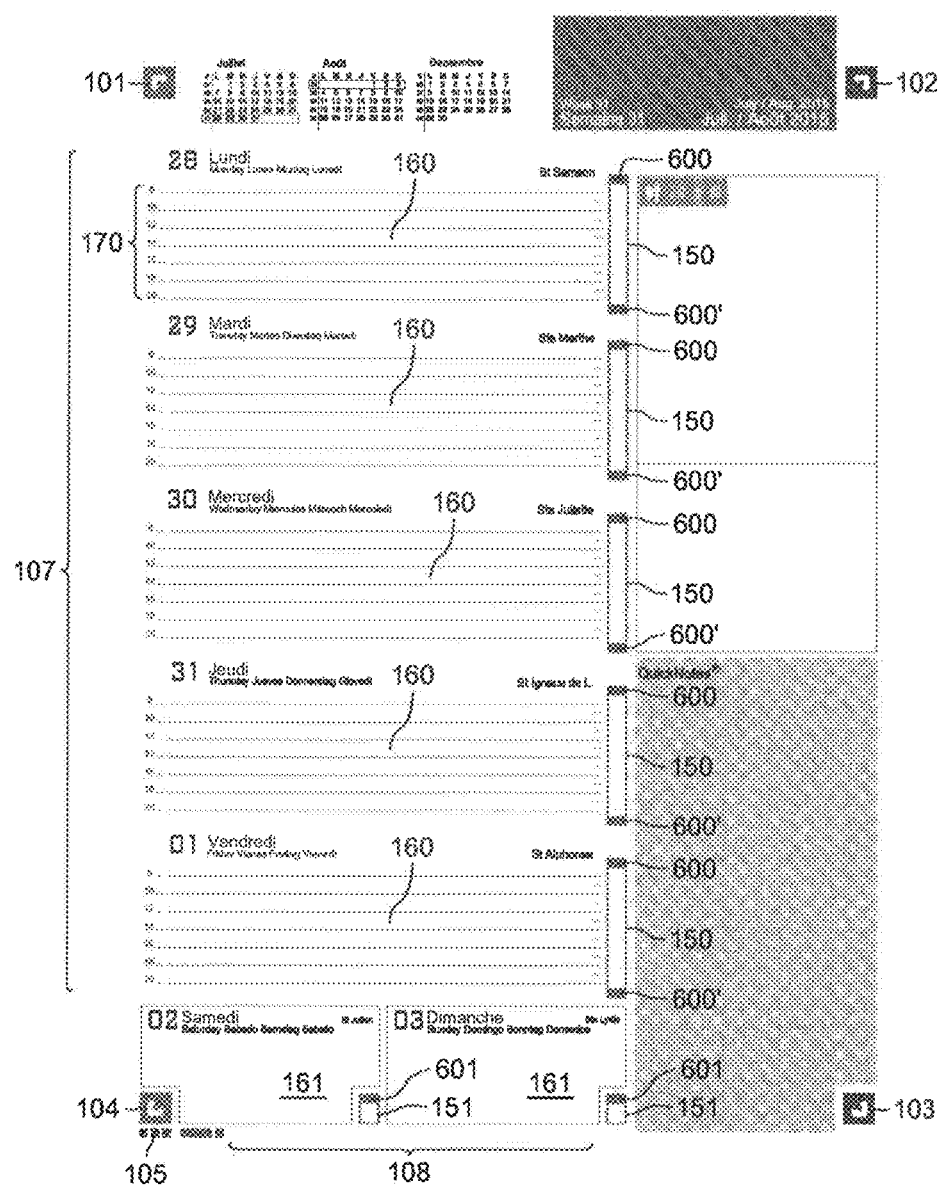
FIG. 1 is an embodiment of a printed surface according to the invention.

FIG. 1 shows a page of a specialized day planner or week-at-a-glance agenda. This is an example of a pre-printed surface according to the invention. This page shows one week (period of seven days beginning on Monday and ending on Sunday) identified in the upper right (here, week 31 of the year 2015) shown in perspective in the corresponding quarter in the upper left.

General markers 101, 102, 103 at 104 are present in the four corners of the page. Each of these markers is made up of a same symbol printed in dark ink and with a high intensity. The same symbol is used here for all four markers, their printing being identical, with the exception of their orientations. Each of the markers is printed with an orientation offset by 90° relative to the orientation of the preceding marker, in the order of the corners of the page. Thus, since the symbol used does not have an order 4 symmetry, one of the markers 101, 102, 103 or 104 uniquely identifies one of the corners of the page. Other embodiments of means equivalent to the general markers 101 to 104 are described later.

A graphic code 105, or microcode, is present in the bottom left of the page, near the marker 104. This graphic code is made up of a series of pieces of binary information, i.e., here, black squares and white squares. Other types of graphic codes could be used, in particular a two-dimensional barcode or a one-dimensional barcode.

The passing of the week shown on the page extends from the top to the bottom of the page. This passing here is made up of a first passing of time 107 for the business days from Monday through Friday and a second passing of time 108 for the weekend. The space dedicated to the first passing of time 107 here is significantly larger than the space dedicated to the second passing of time 108. Each of the days from Monday through Friday is indicated and associated with a space for taking handwritten notes 160. The space 160 comprises a series of lines with which a timescale 170 is associated. Thus, in the illustrated example, there are seven lines and they are associated with the following times: 8:00 AM, 10:00, 12:00, 2:00, 4:00, 6:00 and 8:00 PM. Intermediate graduations are shown on the right side of the zone 160, to make it possible to identify the intermediate hours, namely 9:00, 11:00, 1:00, 3:00, 5:00 and 7:00. These graduations complete the timescale 170, and they may be considered an integral part thereof.

The days Saturday and Sunday are also indicated, at the bottom of the page, in the passing of time 108, and they are associated with unlined handwriting zones 161 smaller than the writing zone 160.

Different zones for various handwritten notes are present on the right side of the page. They will not be discussed here.

Parallel to the passing of time 107 and 108, a series of entry creation zones 150 and 151 is printed. More particularly, an entry creation zone 150 is present for each business day. An entry creation zone 151 is present for each day of the weekend.

An entry creation zone 150 consists of an elongated rectangle with a white surface and black edges, the large edges being thin and the small edges being particularly thick, printed in a dark color with a high intensity, and thus forming specific references 600 and 600', respectively at the head and foot of the entry creation zone 150. The entry creation zone 150 is printed on the right side of the corresponding writing zone 160. The large side of the entry creation zone 150 extends parallel to the timescale 170. There is an entry creation zone 151 for Saturday or Sunday that consists of a nearly square rectangle with a white surface, three sides of which are thin and the fourth side of which is particularly thick, printed in a dark and high-intensity color, and constitutes a specific reference 601.

The specific references 600, 600' and 601 constitute local references that can be used for recalibration in the affected local zones, around objects identified by these references, i.e., the entry creation zones.

Figure 2:
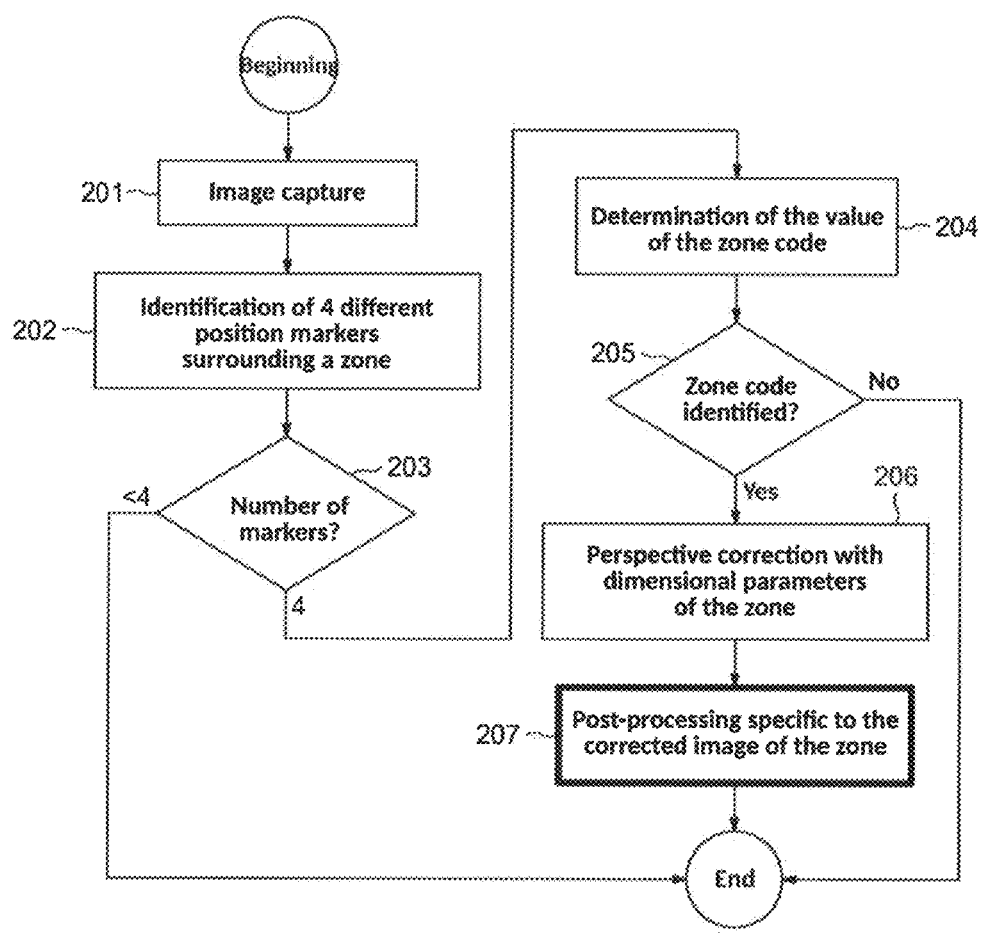
FIG. 2 is a general algorithm implemented in one embodiment of the invention.

FIG. 2 shows a general algorithm for capturing and processing the image of a pre-printed surface as shown in FIG. 1.

The method begins with an image capture step 201, using a camera, generally a digital camera, for example that of a smartphone or digital tablet. The digital image is next handled by an analysis and processing program implemented by a processor, a microprocessor or a microcontroller interacting with a rewritable memory. The entire method can be carried out within a smartphone or digital tablet, although it is also possible to use a camera and a separate microcomputer, among other solutions.

The method may advantageously comprise a step 202 for identifying the four general markers 101, 102, 103 and 104 in the digital image. The program checks that all four markers are positioned relative to one another consistently with respect to the desired surface. To that end, it precisely identifies each marker based on its individual orientation and reconstitutes the rectangle formed by the four markers. A test 203 is carried out to verify that the four markers have been correctly identified.

This method is advantageous because it avoids the need to determine the outline of the pre-printed surface in the image, based on the contrast of the white page on a dark background. Such a method has a risk of errors related to lighting variations on the surface, or related to the presence of two pages in a single image, and not just one page.

The described method more advantageously makes it possible not to use an additional manual means for specifying the contour of the page, such as taking into account a contour entered by hand by the user on his touchscreen.

If the result is positive, the program can advantageously continue with a step 204 for determining the value of the code of the pre-printed surface (zone code) by reading and analyzing the graphic code 105. This graphic code 105 is identified in the image advantageously by using at least one of the general markers 101 to 104, or another means for identifying and calculating the position of the graphic code in the image. Owing to this subtle identification, the graphic code 105 can have a fine graphic design and convey a large density of information. It may also be discreet and aesthetically pleasing.

The graphic code 105 contains information making it possible to identify the type of page being photographed, within a collection of pages making up a range of pages directly referenced by the designer of the printed surface and the designer of the program. In the case of the pre-printed surface of FIG. 1, the graphic code 105 contains or refers to the following information:

the information indicating that the page is a day planner page, and the type of day planner (teaching planner, office planner), which leads to specific post-processing, the dimensional parameters of this page (height-to-width ratio in particular), the information that this planner page shows a single week and shows this week in full, the information that this page is made up of a juxtaposition of zones, with zones dedicated to taking notes and associated with specific days and zones dedicated to recording entries in the agenda, a general description of the global arrangement of the zones on the page, and lastly, the identification of the week in question, which, in the illustrated case, is week 31 of the year 2015 or any other week of the calendar recognized based on a writing convention of the graphic code 105.

The use of such a graphic code containing (or referring to) all or part of this information advantageously enhances the ergonomics of the system by allowing automatic identification of the year and the week, which is more practical than manual entry. Inserting the graphic code for a height-to-width ratio into this information also makes it possible to process surfaces with variable height-to-width ratios.

The method comprises a step 205 for verifying the correct identification of the graphic code 105. If the identification is correct, the method continues with a step 206 for correcting the perspective based on dimensional parameters (in particular height-to-width ratio) of the pre-printed surface identified using the graphic code 105. This step is described in detail in European patent application no. 13,174,643. It makes it possible to modify the digital image obtained using a device taking a photo at a distance from a surface not placed flat, and to obtain the image that would have been obtained by scanning the surface flat. It in particular takes into account the height/width ratio of the page, determined using the graphic code 105, and the location of the global references 101, 102, 103 and 104 identified during step 202.

At the end of this correction step 206, a rectangular digital image of the pre-printed surface of FIG. 1 is obtained.

This image is subject to specific processing according to the invention during a post-processing step 207.

FIG. 3 shows an alternative of the entry creation zone 150, here referenced 1150. The entry creation zone is an elongated rectangle whose surface 1600 is gray and constitutes a mark identifying it, the outside and surroundings essentially being white. A timescale 1170 is present on the right side of this zone and extends parallel to its large side. A writing zone 160 is present on the left. The passing of the business days and hours extends parallel to the entry creation zone 1150. The surface 1600 constitutes a visual reference of the zone for the user.

We have also shown the use of the entry creation zone, here 1150. A reasonably dark and intense line 300, parallel to the passing of time 107 and the timescale 1170, is written by hand by the user in the entry creation zone 150. The beginning of this line is positioned at the start time of the time range corresponding to the created entry, shown on the timescale 1170. The end of the line 300 is brought to the end time of the time range associated with the entry. Thus, in FIG. 3, the line 300 has been drawn from 12:00 to 4:00. The line 300 can be drawn using a HB wood pencil, or red, green, blue or black felt-tip or ballpoint pen, for example. The gray of the surface 1600 is not too intense, such that the line 300 is easily detected.

We have thus created an entry corresponding to an activity during this time range, for example an appointment. Free text or any graphical representation can be recorded in the writing zone 160 at the relevant time range.

The zone 150 of FIG. 1 is used in the same way.

The zone 1150 will be provided with marks for local identification (recalibration), like those shown in FIG. 1, 6, 7, 8, 9 or 10.

FIG. 4 shows an entry creation zone 1151, similar to the entry creation zone 151 of FIG. 1, but, like the zone 1150, made up of a nearly square gray rectangle, the outside and the surroundings being essentially white. The gray surface 1601 constitutes a visual reference of the zone for the user.

No time precision is given for the creation of the entry, in the illustrated embodiment of the zone 1151. Thus, the entry created using the entry creation zone 151 is associated with the corresponding full day. The user is asked simply to check the box formed by the square of the entry creation zone 1151 (or 151 in FIG. 1), with a reasonably dark and intense line. The line checking the entry creation zone 151 is referenced in FIG. 310. It is also possible for the user to fill in the writing zone 161 with free text or any graphical representation.

The zone 1151 will be provided with marks for local identification (recalibration), like those shown in FIG. 1 (reference 601).

Figure 5:
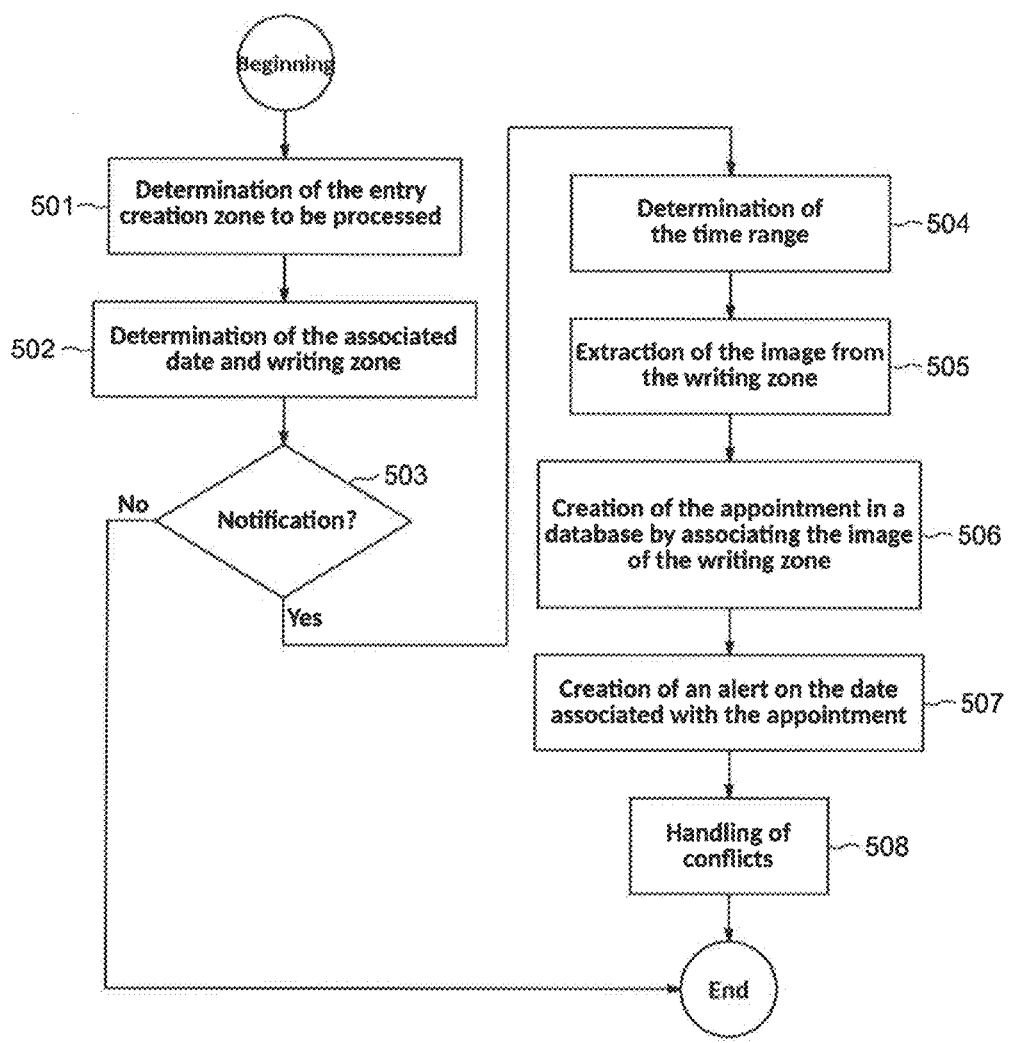
FIG. 5 is an algorithm implemented as part of one embodiment of the invention.

FIG. 5 shows an algorithm implemented to extract the information recorded by the user on the pre-printed page of FIG. 1.

The method begins with the determination, during a step 501, of an entry creation zone to be processed in the image corrected in step 206.

This determination is advantageously done based on the type and content, or more generally the structure of the page identified by the graphic code 105, in particular the arrangement of the zones dedicated to entry creation on the pre-printed circuits. This is a global identification of the entry creation zone.

The determination may be done using any means, but may in particular used the search for a reference specific to the entry creation zone in the image of the page, such as the references 600 and 600', and recalibration of the image based on this reference. This is a local identification of the entry creation zone.

The determination can also be done by identifying this entry creation zone beforehand from a global reference of the page, such as the references 101 to 104. This is a global identification of the entry creation zone.

The determination can also be done by identifying this entry creation zone from a reference that is both a global reference of the page, and a specific reference for the entry creation zone. An example will be given in relation to FIG. 11.

If an entry creation zone is determined in the image, during step 502 it is referenced by its date, based on the arrangement of the entry creation zones, or based on the days on the observed pre-printed page, which are known by the program in a reference table, the page being referenced therein using information present in the graphic code 105.

Once the entry creation zone to be processed is determined and referenced, the program goes to a step 503 for determining the presence or absence of an entry in the entry creation zone.

During the test 503, it is verified that a handwritten entry has thus been determined on the pre-printed surface, and if so, a step 504 makes it possible to determine the time range corresponding to the entry, and identified for example by its start time and end time. To perform this determination, the line 300 (FIG. 3) is examined in the case of entry creation zones 150 or 1150, and in the case of entry creation zones 151 or 1151, the time range is considered to be the entire day.

The precision in the determination of the time range is enhanced by using the marks 600 and 600', which make it possible to eliminate positioning uncertainties. These uncertainties are related to any imprecision of the positioning of the printing of the pre-printed entry creation zone, the latter not necessarily being printed in the same color as other elements of the page, and consequently being able to be slightly offset. These uncertainties are also related to any curvature of the page during the photography, for example related to the presence of a pen beneath the page, deforming it.

Once the time range is determined, the content of the free writing zone 160 or 161 is extracted during a step 505. Then, during a step 506, the program creates an entry in a database associated with an electronic planner contained in an electronic device belonging to the user. Typically, this electronic planner is the electronic planner contained in the user's smartphone or digital tablet, which in all cases comprises a clock.

An alert is created from the appointment start date and a minimum alert duration value before the beginning of the appointment is entered in the electronic device, during a step 507. The alert is generated for the user by using a display on the screen, a sound alert, a blinking LED, an e-mail, or any other means.

Any conflict with an appointment previously recorded in the electronic planner is sought out and processed during a step 508, once the new entry is saved.

An alert is created on the date and time identified by the time range. An advance alert time configured in the device is used, traditionally to remind the user in advance of the appointment. On this basis, the user will be notified by a graphic or audio message beforehand when the appointment recorded in the electronic agenda is approaching.

The entry creation zones of the page may be reviewed one after another based on the reference of the page type and the arrangement of the entry creation zones on the pages of the relevant type, and/or days on the observed pre-printed page, which are known by the program, in a reference table. All of the handwritten entries are extracted.

FIG. 6 shows an alternative of the entry creation zone 150. This time, the entry creation zone, referenced 2150, still an elongated rectangle, is surrounded by a thick, intense dark line on each of the four sides. The timescale 2170 corresponds to the timescale 1180 of FIG. 3. The inner surface is white. The dark line 2600 constitutes a specific reference of the entry creation zone 2150, which allows the local identification thereof by recalibration. A line 300 is used in the same way as before to create an entry.

FIG. 7 shows the respective arrangement of an entry creation zone 3150 and a timescale 3170, in an alternative of the embodiment of FIG. 1. Here, the timescale 3170 is situated at the right of the entry creation zone, as was the case in FIG. 6. Dark lines 3600 and 3600' respectively correspond to dark lines 600 and 600' of FIG. 1 and to the dark line 2600 of FIG. 6.

FIG. 8 shows another respective alternative arrangement of an entry creation zone 4150 and a timescale 4170 is shown. This time, the timescale 4170 is recorded inside the entry creation zone 150, with a lower intensity or a lighter color than the marking elements of the entry creation zone 4150, in particular the specific reference 4600 at the head or the specific reference 4600' at the foot.

In FIG. 9, another alternative of the entry creation zone is shown. The entry creation zone here is referenced 5150 and it is associated with a fine timescale 5170, since the hours are all indicated from 7 AM to 8 PM, the half-hours also being shown by horizontal dashes. This choice of timescale, associated with a single entry creation zone identified by the markers 5600 and 5600' at the head and foot of the entry creation zone, results in the usefulness of adding intermediate or secondary markers 5610 along the large sides of the entry creation zone 5150. Here, there are three secondary markers 5610 on each side of the entry creation zone, opposite one another in pairs. The markers 5600, 5600' constitute references specific to the entry creation zone 5150, which allow the local identification thereof, by recalibration.

FIG. 10 shows an alternative of the entry creation zone. In this case, this zone is referenced 6150. It comprises thick and dark, but periodic, marks 6600 and 6600', having a square shape, arranged at each of the two ends of the entry creation zone 6150. Unlike the markers previously described, they do not make it possible to identify the entry creation zone in the direction perpendicular to its elongation. The markers 6600 and 6600' constitute references specific to the entry creation zone 6150, which allow the local identification thereof by recalibration. Timescale 6170 corresponds to timescale 1170 of FIG. 3.

Figure 11:
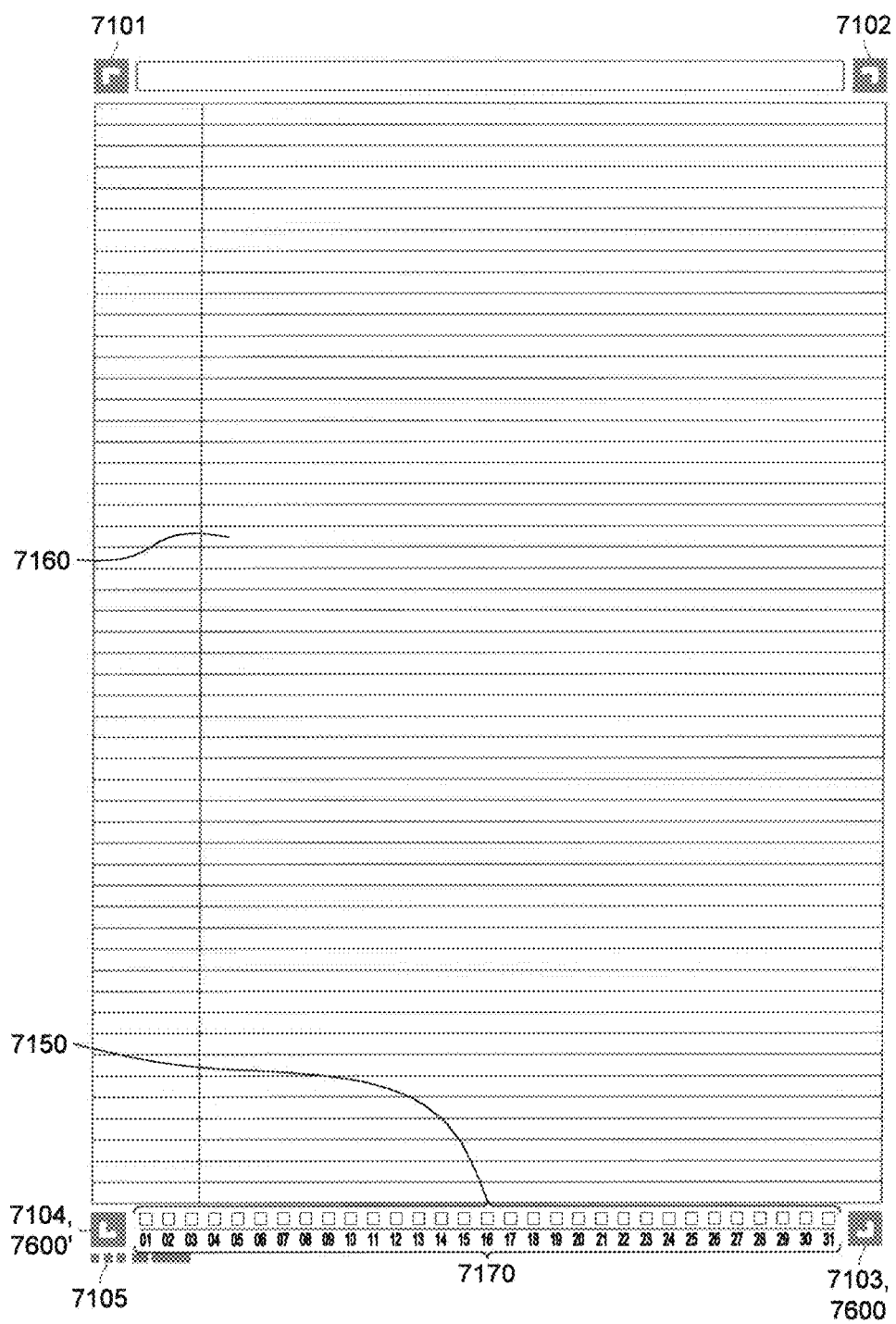
FIG. 11 shows another embodiment of a printed surface according to the invention.

FIG. 11 shows a second embodiment of a pre-printed surface according to the invention. This is a sheet from a time book. Here, there are global markers 7101, 7102, 7103 and 7104 in the four corners of the sheet, similarly to what was shown in relation with FIG. 1. The main part of the sheet consists of a free note taking zone 7160, here provided with lines for writing. The lower part of the page, here between the markers 7103 and 7104, comprises a series of 31 squares to be checked which are associated, opposite, with the numbers of the days of a month, from 1 to 31, which make up a timescale 7170.

The series of squares makes up an entry creation zone 7150. By checking a square, the user identifies the day of the month with which free notes taken on the page are associated. The pre-printed markers 7103 and 7104 facilitate the identification of the graphical numbering of the days of the month, from 1 to 31. In addition to being global markers, they therefore constitute specific markers 7600 and 7600' for the entry creation zone 7150 formed by the series of squares. They allow the local identification thereof by recalibration.

However, before this recalibration is done, a graphical code 7105 allows the associated computer program to be informed of the fact that the pre-printed surface is a time book sheet and know the structure of the page (height-to-width ratio, type and content) and to globally identify the entry creation zone 7150 based on its general location in the image. The recalibration is done in a second step.

Figure 12:
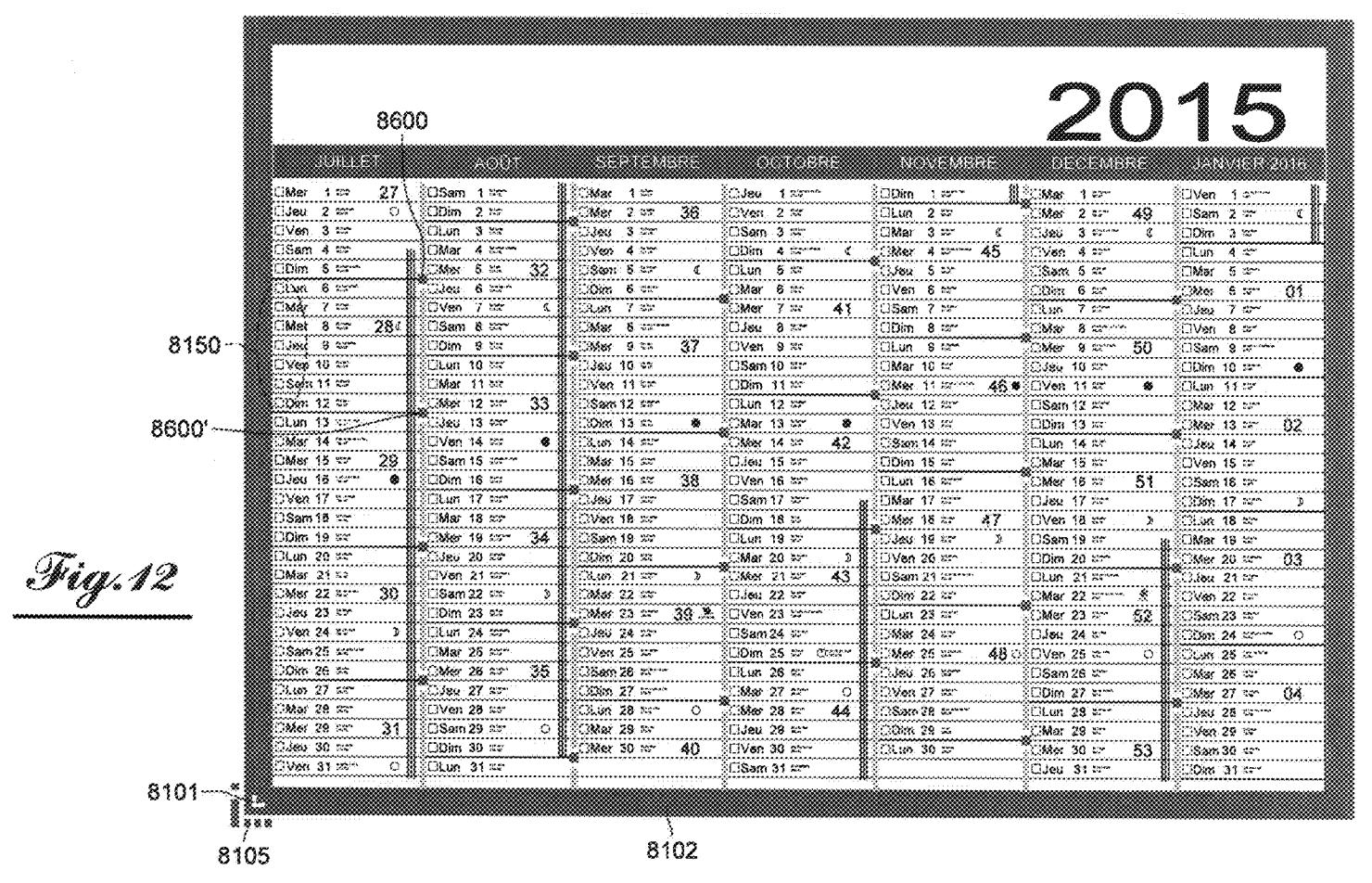

FIG. 12 shows a third embodiment of a pre-printed surface according to the invention. This is a calendar, for example a wall calendar that may be in A4 format or a larger format. The face shown here includes seven months of the year, organized in the form of seven columns following one another from left to right. In each of these columns, the days of the month follow one another from top to bottom. A general mark makes it possible to identify the four corners of the page. This general mark comprises a symbol 8101, preferably without order 4 symmetry, and preferably printed with a dark and intense ink, in one of the four corners of the sheet. The mark also comprises a frame 8102 comprising three angles visible in the other three corners of the structure. Each of the corners is therefore identifiable and, once referenced, it may be identified as being the top left, top right, bottom left or bottom right corner. Here, this is an alternative of the global references shown in FIGS. 1 and 11. It is essentially a distinctive rectangular contour with an orientation referenced in one of the corners. Alternatively, it is for example possible to use two separate vertical bars or two separate horizontal bars, which, in both of these cases, will each make it possible on the one hand to identify the borders of the pre-printed surface, and on the other hand to orient the image.

A graphic code 8105 with a function similar to that of the graphic code 105, but adapted for the calendar page, is also present. It refers to information pertaining to the nature of the surface (calendar), the global structure of the page (height-to-width ratio, division into columns, identification of the affected months, in particular, and global position of the entry creation zones on the pre-printed surface).

In each of the entries of each column, corresponding to a given day, a square checkbox is present so as to allow the user of the calendar to create an entry by checking the box, the entry being associated with the corresponding day.

Furthermore, in each column, between the line corresponding to Sunday and the line corresponding to Monday, for each week, a mark in a dark and intense color (for example, black squares 8600 and 8600') facilitates the local identification of the graphical representation of the week, situated horizontally between two successive marks. Thus, the two square marks 8600 and 8600' constitute specific markers for the entry creation zone 8150 made up of the series of seven squares situated in the corresponding column between the horizontal boundaries defined by the two markers. One will note that the entry creation zone is horizontally offset relative to the markers, but the identification can use only two markers, or be improved with the other marking elements of the page.

The invention is not limited to the described embodiments, but rather encompasses all alternatives within the reach of one skilled in the art.

The invention claimed is:
1. A stationery system comprising:
 a collection of pre-printed surfaces on which handwritten entries can be made, wherein each pre-printed surface comprises
  a pre-printed graphical representation of passing of at least one segment of a plurality of segments of a period of time,
  at least one entry creation zone for user entry and identification of at least one segment,
  at least one pre-printed mark for local identification of the at least one entry creation zone,
  at least two pre-printed marks for global identification of the pre-printed surface and which establish reference positions on the pre-printed surface, and
  a graphical code comprising
   information for identifying, using the graphical code, the respective pre-printed surface within the collection of pre-printed surfaces, composition of the respective pre-printed surface with respect to arrangement of the at least one entry creation zone, and dimensional parameters of the pre-printed surface; and a computer program including a sequence of instructions which, when executed by a computer processor, process images of respective pre-printed surfaces, correct perspectives of the images of respective pre-printed surfaces, produced by angled imaging of the pre-printed surfaces, using the pre-printed marks for global identification and the dimensional parameters of the graphical code of the respective pre-printed surface, identify an entry creation zone in an image of a respective pre-printed surface, using the at least one pre-printed mark for local identification and the at least two pre-printed marks for global identification, identify on a respective pre-printed surface, within the collection of pre-printed surfaces, a handwritten entry created by the user in an entry creation zone and corresponding to a segment, and create a time entry in a database associated with an electronic planner, based on identifying of the handwritten entry created by the user, using the segment appearing in the entry creation zone.

2. The stationery system according to claim 1, wherein the at least one pre-printed mark for local identification comprises a plurality of pre-printed marks for local identification, and each pre-printed mark for local identification facilitates identification of a respective subdivision of the entry creation zone and corresponding to a respective segment of the period of time.

3. The stationery system according to claim 1, wherein the at least one pre-printed mark for local identification comprises a mark facilitating identification of a subdivision of the entry creation zone situated centrally on the pre-printed surface.

4. The stationery system according to claim 1, wherein the at least one pre-printed mark for local identification helps in identifying a border of the at least one entry creation zone.

5. The stationery system according to claim 1, wherein the at least one pre-printed mark for local identification comprises at least one mark at a head and at least one mark at a foot of an entry creation zone elongated parallel to a pre-printed graphical representation of the passing of the period of time.

6. The stationery system according to claim 1, wherein the at least one pre-printed mark for local identification comprises at least three marks along an entry creation zone elongated parallel to the pre-printed graphical representation of the passing of the period of time, and the at least three marks are separated from one another along the entry creation zone elongated parallel to the pre-printed graphical representation of the passing of the period of time.

7. The stationery system according to claim 1, wherein the at least one entry creation zone is elongated parallel to the pre-printed graphical representation of the passage of the period of time, and the at least one pre-printed mark for local identification identifies the at least one entry creation zone in a direction perpendicular to elongation of the entry creation zone that is elongated.

8. The stationery system according to claim 1, wherein the pre-printed graphical representation of the passing of the period of time comprises a printed scale included in the at least one entry creation zone and printed with a lighter color or lower intensity relative to the at least one pre-printed mark for local identification.

9. The stationery system according to claim 1, wherein the pre-printed graphical representation of the passing of the period of time comprises a scale printed outside the at least one entry creation zone, at a distance from the at least one pre-printed mark for local identification.

10. The stationery system according to claim 1, further comprising a zone in which handwritten notes may be entered, wherein the zone in which handwritten notes may be entered is associated in pre-printing with respective segments of the period of time.

11. The stationery system according to claim 1, wherein
the period of time is equal to three or four days and represents one week over two opposite pages of the pre-printed surfaces, or the time period is equal to one week shown on a single page of the pre-printed surfaces or two weeks shown on a single page of the pre-printed surfaces.

12. The stationery system according to claim 1, wherein the collection of the pre-printed surfaces forms a calendar comprising a pre-printed surface in which the period of time is in a range from 3 to 24 months.

13. The stationery system according to claim 1, wherein the computer program includes a sequence of instructions which, when executed by a computer processor, search for any handwritten entry in the at least one entry creation zone, and, if a handwritten entry is found, create an electronic entry, in an electronic representation, of the period of time that has been entered, and associate the electronic entry with the segment of the period of time.

14. The stationery system according to claim 13, wherein the computer program, when executed, extracts at least one time range by analyzing handwritten entries found in the at least one entry creation zone in a timescale pre-printed on the pre-printed surface.

15. The stationery system according to claim 13, wherein the computer program, when executed, handles any conflicts between a handwritten entry found on the pre-printed surface and an electronic entry in the electronic representation that has been created.

16. The stationery system according to claim 13, wherein the computer program, when executed, extracts information from a zone of the pre-printed surface associated with the passing of the period of time, and stores the information in the electronic representation of the passing of the period of time.

17. The stationery system according to claim 13, wherein the computer program, when executed, creates an alarm to alert a user before beginning of the segment of the period of time.

* * * * *